(12) United States Patent
Cui et al.

(10) Patent No.: US 10,725,904 B2
(45) Date of Patent: Jul. 28, 2020

(54) SYNCHRONIZING NAND LOGICAL-TO-PHYSICAL TABLE REGION TRACKING

(71) Applicant: Micron Technology, Inc., Boise, ID (US)

(72) Inventors: Zhao Cui, Shanghai (CN); Eric Kwok Fung Yuen, Dublin, CA (US); Guan Zhong Wang, Shanghai (CN); Xinghui Duan, Shanghai (CN); Giuseppe D'Eliseo, Caserta (IT); Giuseppe Ferrari, Naples (IT)

(73) Assignee: Micron Technology, Inc., Boise, ID (US)

( * ) Notice: Subject to any disclaimer, the term of this patent is extended or adjusted under 35 U.S.C. 154(b) by 71 days.

(21) Appl. No.: 16/075,543

(22) PCT Filed: Dec. 13, 2017

(86) PCT No.: PCT/CN2017/115868
§ 371 (c)(1),
(2) Date: Aug. 3, 2018

(87) PCT Pub. No.: WO2019/113820
PCT Pub. Date: Jun. 20, 2019

(65) Prior Publication Data
US 2020/0142821 A1 May 7, 2020

(51) Int. Cl.
*G06F 12/02* (2006.01)
*G06F 12/0873* (2016.01)

(52) U.S. Cl.
CPC ...... *G06F 12/0246* (2013.01); *G06F 12/0253* (2013.01); *G06F 12/0292* (2013.01);
(Continued)

(58) Field of Classification Search
CPC .................. G06F 12/0246; G06F 2212/7205
See application file for complete search history.

(56) References Cited

U.S. PATENT DOCUMENTS

2013/0151754 A1  6/2013  Post et al.
2015/0324284 A1*  11/2015  Kim ............ G06F 12/0246
711/103
(Continued)

FOREIGN PATENT DOCUMENTS

EP  2341439 A1  7/2011

OTHER PUBLICATIONS

"International Application Serial No. PCT/CN2017/115868, International Search Report dated Sep. 12, 2018", 4 pgs.
(Continued)

*Primary Examiner* — Edward J Dudek, Jr.
(74) *Attorney, Agent, or Firm* — Schwegman Lundberg & Woessner, P.A.

(57) ABSTRACT

Devices and techniques for synchronizing NAND logical-to-physical table region tracking are described herein. Table region data structures for physical blocks are maintained. These structures include logical-to-physical (L2P) mapping table portions that point to the respective physical blocks. When garbage collection is performed on a block, table region structures for that block, and another (e.g., the next block to be garbage collected) are read to avoid loading L2P table regions that do not point to the block. If any of the read portions of the L2P table region fail to point to either the block or the other block, these L2P table portions are removed from the loaded table region data structures.

31 Claims, 8 Drawing Sheets

(52) U.S. Cl.
CPC .. *G06F 12/0873* (2013.01); *G06F 2212/7201* (2013.01); *G06F 2212/7208* (2013.01); *G06F 2212/7209* (2013.01)

(56) References Cited

U.S. PATENT DOCUMENTS

| | | |
|---|---|---|
| 2017/0075600 A1 | 3/2017 | Jung et al. |
| 2017/0220462 A1 | 8/2017 | Tsao et al. |
| 2018/0260132 A1* | 9/2018 | Wang ..................... G06F 12/02 |

OTHER PUBLICATIONS

"International Application Serial No. PCT/CN2017/115868, Written Opinion dated Sep. 12, 2018", 4 pgs.

\* cited by examiner

SYNCHRONIZING NAND LOGICAL-TO-PHYSICAL TABLE REGION TRACKING

PRIORITY APPLICATION

This application is a U.S. National Stage Application under 35 U.S.C. 371 from International Application No. PCT/CN2017/115868, filed Dec. 13, 2017, which is incorporated herein by reference in its entirety.

BACKGROUND

Memory devices are typically provided as internal, semiconductor, integrated circuits in computers or other electronic devices. There are many different types of memory, including volatile and non-volatile memory.

Volatile memory requires power to maintain its data, and includes random-access memory (RAM), dynamic random-access memory (DRAM), or synchronous dynamic random-access memory (SDRAM), among others.

Non-volatile memory can retain stored data when not powered, and includes flash memory, read-only memory (ROM), electrically erasable programmable ROM (EEPROM), static RAM (SRAM), erasable programmable ROM (EPROM), resistance variable memory, such as phase-change random-access memory (PCRAM), resistive random-access memory (RRAM), magnetoresistive random-access memory (MRAM), or 3D XPoint™ memory, among others.

Flash memory is utilized as non-volatile memory for a wide range of electronic applications. Flash memory devices typically include one or more groups of one-transistor, floating gate or charge trap memory cells that allow for high memory densities, high reliability, and low power consumption.

Two common types of flash memory array architectures include NAND and NOR architectures, named after the logic form in which the basic memory cell configuration of each is arranged. The memory cells of the memory array are typically arranged in a matrix. In an example, the gates of each floating gate memory cell in a row of the array are coupled to an access line (e.g., a word line). In a NOR architecture, the drains of each memory cell in a column of the array are coupled to a data line (e.g., a bit line). In a NAND architecture, the drains of each memory cell in a string of the array are coupled together in series, source to drain, between a source line and a bit line.

Both NOR and NAND architecture semiconductor memory arrays are accessed through decoders that activate specific memory cells by selecting the word line coupled to their gates. In a NOR architecture semiconductor memory array, once activated, the selected memory cells place their data values on bit lines, causing different currents to flow depending on the state at which a particular cell is programmed. In a NAND architecture semiconductor memory array, a high bias voltage is applied to a drain-side select gate (SGD) line. Word lines coupled to the gates of the unselected memory cells of each group are driven at a specified pass voltage (e.g., Vpass) to operate the unselected memory cells of each group as pass transistors (e.g., to pass current in a manner that is unrestricted by their stored data values). Current then flows from the source line to the bit line through each series coupled group, restricted only by the selected memory cells of each group, placing current encoded data values of selected memory cells on the bit lines.

Each flash memory cell in a NOR or NAND architecture semiconductor memory array can be programmed individually or collectively to one or a number of programmed states. For example, a single-level cell (SLC) can represent one of two programmed states (e.g., 1 or 0), representing one bit of data.

However, flash memory cells can also represent one of more than two programmed states, allowing the manufacture of higher density memories without increasing the number of memory cells, as each cell can represent more than one binary digit (e.g., more than one bit). Such cells can be referred to as multi-state memory cells, multi-digit cells, or multi-level cells (MLCs). In certain examples, MLC can refer to a memory cell that can store two bits of data per cell (e.g., one of four programmed states), a triple-level cell (TLC) can refer to a memory cell that can store three bits of data per cell (e.g., one of eight programmed states), and a quad-level cell (QLC) can store four bits of data per cell. MLC is used herein in its broader context, to can refer to any memory cell that can store more than one bit of data per cell (i.e., that can represent more than two programmed states).

Traditional memory arrays are two-dimensional (2D) structures arranged on a surface of a semiconductor substrate. To increase memory capacity for a given area, and to decrease cost, the size of the individual memory cells has decreased. However, there is a technological limit to the reduction in size of the individual memory cells, and thus, to the memory density of 2D memory arrays. In response, three-dimensional (3D) memory structures, such as 3D NAND architecture semiconductor memory devices, are being developed to further increase memory density and lower memory cost.

Such 3D NAND devices often include strings of storage cells, coupled in series (e.g., drain to source), between one or more source-side select gates (SGSs) proximate a source, and one or more drain-side select gates (SGDs) proximate a bit line. In an example, the SGSs or the SGDs can include one or more field-effect transistors (FETs) or metal-oxide semiconductor (MOS) structure devices, etc. In some examples, the strings will extend vertically, through multiple vertically spaced tiers containing respective word lines. A semiconductor structure (e.g., a polysilicon structure) can extend adjacent a string of storage cells to form a channel for the storages cells of the string. In the example of a vertical string, the polysilicon structure can be in the form of a vertically extending pillar. In some examples the string can be "folded," and thus arranged relative to a U-shaped pillar. In other examples, multiple vertical structures can be stacked upon one another to form stacked arrays of storage cell strings.

Memory arrays or devices can be combined together to form a storage volume of a memory system, such as a solid-state drive (SSD), a Universal Flash Storage (UFS™) device, a MultiMediaCard (MMC) solid-state storage device, an embedded MMC device (eMMC™), etc. An SSD can be used as, among other things, the main storage device of a computer, having advantages over traditional hard drives with moving parts with respect to, for example, performance, size, weight, ruggedness, operating temperature range, and power consumption. For example, SSDs can have reduced seek time, latency, or other delay associated with magnetic disk drives (e.g., electromechanical, etc.). SSDs use non-volatile memory cells, such as flash memory cells to obviate internal battery supply requirements, thus allowing the drive to be more versatile and compact.

An SSD can include a number of memory devices, including a number of dies or logical units (e.g., logical unit numbers or LUNs), and can include one or more processors or other controllers performing logic functions required to operate the memory devices or interface with external systems. Such SSDs can include one or more flash memory die, including a number of memory arrays and peripheral circuitry thereon. The flash memory arrays can include a number of blocks of memory cells organized into a number of physical pages. In many examples, the SSDs will also include DRAM or SRAM (or other forms of memory die or other memory structures). The SSD can receive commands from a host in association with memory operations, such as read or write operations to transfer data (e.g., user data and associated integrity data, such as error data and address data, etc.) between the memory devices and the host, or erase operations to erase data from the memory devices.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

DETAILED DESCRIPTION

Figure 1:
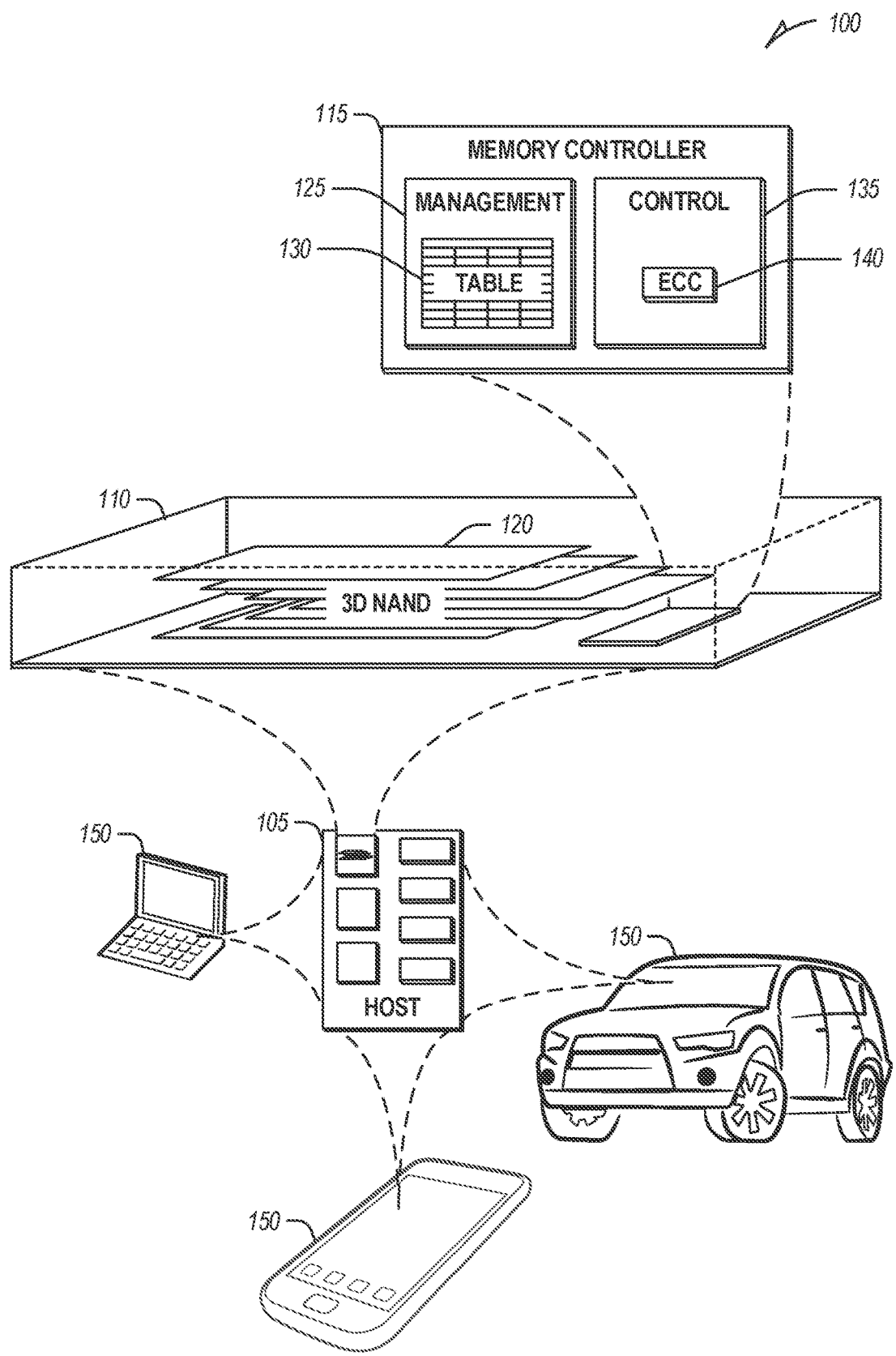
FIG. 1 illustrates an example of an environment including a memory device.

Many storage devices, such as flash devices, use translation tables to map logical elements (e.g., pages or blocks) to the physical equivalents of the logical elements. This allows the controller of the device to perform a variety of techniques to increase the performance of, or longevity of, the storage elements of the device. For example, NAND flash cells experience physical wear with write or erase cycles. Further, these devices require many elements to be erased at one time (e.g., block erasure). To address these issues, the controller generally spreads writes around available cells (e.g., to reduce wearing out of these cells) and migrates good pages from blocks to erase the block and thus free additional space. In both cases, a host address for a given page or block can be constant even though the data to which it refers is moved to different physical pages or blocks by virtue of the translation table.

Translation tables are generally loaded into an internal memory of the controller (e.g., a working memory). If the table size is greater than the working memory (e.g., in random access memory (RAM), such as dynamic RAM (DRAM) or static RAM (SRAM)) of the controller, a portion of the table is loaded into the working memory and the remainder of the table is stored in other storage (such as NAND flash array elements). If a translation request (e.g., a logical-to-physical (L2P) mapping) is not in the working memory, the controller replaces the internal memory portion of the table with the appropriate portion from other storage. This process can increase latencies when performing operations such as reading or writing to the storage device. Although increased working memory can reduce these occurrences, this comes at a manufacturing and power cost that can be unacceptable for a given application.

When performing certain maintenance tasks, such as garbage collection (GC), the fragmented nature of L2P tables may become an issue. For example, NAND devices typically allow single page writes but erasure is performed at the block level (e.g., a block is the smallest unit of the NAND device that can be individually erased). Garbage collection is designed to recover free space when the free physical space in the NAND devices gets low. Garbage collection generally involves copying logical valid pages from a source block to a destination block and then erasing the source block to free the space. To accomplish the copying, the L2P table is traditionally searched to identify valid pages of the source block by looking for physical addresses that refer to the source block.

The traditional approach to garbage collection when the complete L2P table cannot fit within working memory has some problems. For example, the search can be time consuming because each L2P region is retrieved from the slower NAND storage and placed into working memory to conduct the search. When an L2P region contains no physical pages in the block, the entire load and search time is wasted. This results in high latencies while the device waits for the garbage collection process to complete.

A table region data structure can be maintained for a block to increase the speed with which garbage collection proceeds. The table region data structure indicates which L2P table regions are pertinent to a given block. For example, when a page is written to a block, the corresponding table region data structure is modified to indicate the L2P region that maps the logical page to that physical page. When garbage collection is initiated on the block, the device then loads the table region data structure and searches the indicated L2P table regions. This process limits the L2P regions loaded into working memory to only those regions that are likely to include references to the block.

An implementation of the table region data structure can include a bitmap (e.g., a binary array) in which an index corresponds to an L2P table region and the value (e.g., a binary '1' versus a binary '0') at the index indicates whether the L2P region holds (or held) a reference to a physical page of the block. In this example, when a block is erased, the related bitmap is fully reset (e.g., all values are set to binary '0'). When a page belonging to a L2P region is written to the block (e.g., for either host write or garbage collection procedure), the related bit in the bitmap is set (e.g., to binary '1'). In an example, after the block is fully written—that is, there are no more free pages—the bitmap for the block is not changed until the block is erased.

The table region data structure use described above provides several advantages to traditional block management. For example, fewer L2P regions are loaded into working memory, reducing the time to perform valid page searches within the block. Further, the efficiency of the search is increased as each L2P region loaded into working memory is likely to yield a valid page that will be moved during the operation. Further, because the table region data structure is updated as part of a write to a block, there is very little maintenance overhead in maintaining the structure.

The efficient table region data structure described above may experience data stagnation over time. Because the table region data structure is only updated during writes, and reset during a block erase, there is a possibility that an L2P region indicated in the table region data structure has no valid pages because, for example, the original page was re-written (e.g., updated or erased from the host perspective). In this case, the new data, if it exists, is written to a new physical page that may be in a different block. However, the table region data structure is not updated to reflect this change, resulting in a stale indication for that L2P table region in the table region data structure. Thus, if the L2P region is loaded, it will not have a valid page to move to a new block during garbage collection, for example.

If there are many consecutive stale indications in the table region data structure, valid page search operations can be needlessly extended. Thus, for garbage collection, if the same working memory is used in the device to buffer host data (e.g., data that is part of host writes) and the L2P table regions to perform the search, the host will experience increased latency while the garbage collection processes runs.

Stale data in the table region data structure can be addressed in an efficient manner by updating one block's table region data structure when L2P regions are loaded for another block, such as would happen if the other block was undergoing garbage collection. Because the L2P table regions are already being loaded and searched for the garbage collection, the additional processing to look for valid pages in the first block is trivial. Stale data, at least as pertains to those L2P table regions loaded for the garbage collection, if removed in the updated table region data structure. Thus, future garbage collection on the block will be more efficient, reducing latency for host operations.

The table region data structure for blocks can increase valid page searches for blocks, and thus increase the speed with which corresponding operations, such as garbage collection, are performed. This is accomplished by loading pertinent L2P table regions as determined when data is written to the block. As noted above, stale data can lead to decreased efficiency in the valid page search. This issue is addressed by filtering the stale data in table region data structures during an operation in which L2P table regions are loaded for a second block. These loaded L2P regions are also searched for valid pages pointing to the first block and, if there are no valid pages, the indication for that L2P region is reset (e.g., reverted to a binary '0'). Thus, a future garbage collection, for example, on the first block, will not encounter as much, if any, stale data. Additional details and examples are described below.

Devices employing the translation table modifications discussed herein can fit in many applications. Electronic devices, such as mobile electronic devices (e.g., smart phones, tablets, etc.), electronic devices for use in automotive applications (e.g., automotive sensors, control units, driver-assistance systems, passenger safety or comfort systems, etc.), and internet-connected appliances or devices (e.g., internet-of-things (IoT) devices, etc.), have varying storage needs depending on, among other things, the type of electronic device, use environment, performance expectations, etc.

Electronic devices can be broken down into several main components: a processor (e.g., a central processing unit (CPU) or other main processor); memory (e.g., one or more volatile or non-volatile RAM memory device, such as DRAM, mobile or low-power double-data-rate synchronous DRAM (DDR SDRAM), etc.); and a storage device (e.g., non-volatile memory (NVM) device, such as flash memory, read-only memory (ROM), an SSD, an MMC, or other memory card structure or assembly, etc.). In certain examples, electronic devices can include a user interface (e.g., a display, touch-screen, keyboard, one or more buttons, etc.), a graphics processing unit (GPU), a power management circuit, a baseband processor or one or more transceiver circuits, etc.

FIG. 1 illustrates an example of an environment 100 including a host device 105 and a memory device 110 configured to communicate over a communication interface. The host device 105 or the memory device 110 can be included in a variety of products 150, such as Internet of Things (IoT) devices (e.g., a refrigerator or other appliance, sensor, motor or actuator, mobile communication device, automobile, drone, etc.) to support processing, communications, or control of the product 150.

The memory device 110 includes a memory controller 115 and a memory array 120 including, for example, a number of individual memory die (e.g., a stack of three-dimensional (3D) NAND die). In 3D architecture semiconductor memory technology, vertical structures are stacked, increasing the number of tiers, physical pages, and accordingly, the density of a memory device (e.g., a storage device). In an example, the memory device 110 can be a discrete memory or storage device component of the host device 105. In other examples, the memory device 110 can be a portion of an integrated circuit (e.g., system on a chip (SOC), etc.), stacked or otherwise included with one or more other components of the host device 105.

One or more communication interfaces can be used to transfer data between the memory device 110 and one or more other components of the host device 105, such as a Serial Advanced Technology Attachment (SATA) interface, a Peripheral Component Interconnect Express (PCIe) interface, a Universal Serial Bus (USB) interface, a Universal Flash Storage (UFS) interface, an eMMC™ interface, or one or more other connectors or interfaces. The host device 105 can include a host system, an electronic device, a processor, a memory card reader, or one or more other electronic devices external to the memory device 110. In some examples, the host 105 can be a machine having some portion, or all, of the components discussed in reference to the machine 800 of FIG. 8.

The memory controller 115 can receive instructions from the host 105, and can communicate with the memory array 120, such as to transfer data to (e.g., write or erase) or from (e.g., read) one or more of the memory cells, planes, sub-blocks, blocks, or pages of the memory array 120. The memory controller 115 can include, among other things, circuitry or firmware, including one or more components or integrated circuits. For example, the memory controller 115 can include one or more memory control units, circuits, or components configured to control access across the memory array 120 and to provide a translation layer between the host 105 and the memory device 110.

The memory manager 125 can include, among other things, circuitry or firmware, such as a number of components or integrated circuits associated with various memory management functions. For purposes of the present description example memory operation and management functions will be described in the context of NAND memory. Persons skilled in the art will recognize that other forms of non-volatile memory can have analogous memory operations or management functions. Such NAND management functions include wear leveling (e.g., garbage collection or reclamation), error detection or correction, block retirement, or one or more other memory management functions. The memory manager 125 can parse or format host commands (e.g., commands received from a host) into device commands (e.g., commands associated with operation of a memory array, etc.), or generate device commands (e.g., to accomplish various memory management functions) for the array controller 135 or one or more other components of the memory device 110.

The memory manager 125 can include a set of management tables 130 configured to maintain various information associated with one or more component of the memory device 110 (e.g., various information associated with a memory array or one or more memory cells coupled to the memory controller 115). For example, the management tables 130 can include information regarding block age, block erase count, error history, or one or more error counts (e.g., a write operation error count, a read bit error count, a read operation error count, an erase error count, etc.) for one or more blocks of memory cells coupled to the memory controller 115. In certain examples, if the number of detected errors for one or more of the error counts is above a threshold, the bit error can be referred to as an uncorrectable bit error. The management tables 130 can maintain a count of correctable or uncorrectable bit errors, among other things. In an example, the management tables 103 may include translation tables or a L2P mapping.

The memory manager 125 can implement and use table region data structures to reduce memory device 110 latency in operations that involve searching L2P tables for valid pages, such as garbage collection. To this end, the memory manager 125 is arranged to maintain a first table region data structure for a first physical block. The table region data structure includes indications of L2P mapping table regions, of the L2P table. In an example, the L2P table is larger than a working memory for the memory manager 125, which may be shared with the memory controller 115 or other components of the memory device 110. The L2P table regions are, however, not larger than the working memory, permitting the L2P regions to be loaded into the working memory and operated upon.

The memory manager 125 is arranged to perform garbage collection on a second physical block. Here, the garbage collection includes reading the first table region data structure—which, in an example, is stored in the first physical block—reading a second table region data structure for the second physical block, and loading regions of the L2P table that are indicated in the second table region data structure to move valid physical pages of the second physical block. Thus, while the garbage collection is being performed on the second block, the table region data structures for both the first and second blocks are read (e.g., loaded into the working memory).

In an example, a table region data structure is a bitmap (e.g., a binary array). In an example, the bitmap includes a bit for each region of multiple, mutually exclusive, regions that span the L2P table. Thus, L2P table regions do not overlap with each other and the combination of all L2P table regions span the entire L2P table. The bitmap includes a bit for each of these regions. In an example, L2P table regions are ordered and an index of the bit corresponds to an order of a given L2P table region. For example, if there are two L2P table regions for the L2P table, one covering the first half of the L2P table and one covering a second half of the L2P table, then index '0' of the bitmap corresponds to the first region and index '1' of the bitmap corresponds to the second region. There is no requirement, however, that the regions covering contiguous portions of the L2P table, nor that they have a particular order. However, whatever criteria used to assign a given L2P table region to a given index of the bitmap must be consistent (e.g., region 'Y' always maps to the same index). In an example, the L2P table region indications in the bitmap (e.g., to indicate that a given L2P table region has, at one time, a physical page in the block) are a logical one (e.g., binary '1') in a respective bit of that region.

The memory manager 125 is arranged to remove indications of the L2P table regions from the first table data structure that are loaded (e.g., into the working memory) and do not include a reference to a physical page in the first physical block. The result of the removals creates an updated first table region data structure. The updated table region data structure is then written to the array 120. This last set of activities filter stale data from the first table data structure with minimum overhead as the L2P regions were already being loaded to perform the garbage collection on the second physical block. As the data was already in the working memory, search the data for valid physical pages pointing to both the first physical block and the second physical block uses only a small amount of additional processing. Moreover, the next time the first physical block undergoes garbage collection, it will use the updated first table region data structure, resulting in fewer unfruitful L2P table region loads to complete the task.

In an example, the garbage collection includes loading, prior to creating the updated first table region data structure, regions of the L2P table with an indication in the first table region data structure and no indication in the second table region data structure. This example allows for the L2P table regions of the first block to be loaded to completely filtering the first table region data structure. Although L2P table regions unnecessary to the second block will be loaded in this instance, it may produce an overall performance gain as the first block, when undergoing garbage collection, will not have any data that was stale prior to the garbage collection of the second block.

Although many physical block table region data structures may be filtered for each garbage collection of any given physical block, it can be beneficial to limit the number of blocks that benefit from the filtering to reduce overall processing time for the garbage collection. Thus, in an example, the number of table region data structures that are updated are below a threshold. In an example, the threshold is one. In an example, selecting table region data structures to filter is random. In an example, is based on a garbage collection ordering, in which the highest order (e.g., planned to undergo garbage collection earlier) table region data structures are selected until the threshold is met.

In an example, the memory manager 125 is arranged to erase the second physical block after the valid physical pages of the second physical block are moved. The memory manager 125 then initializes the second table region data structure in response to erasing the second physical block. Thus, once the garbage collection is complete, the table region data structure for the block is set to a known, empty, state, clearing all stale data with a single operation. In an example, where the table region data structure is a bitmap, the table region data structure is initialized by writing logical zeros (e.g., binary '0') in each bit of the bitmap.

In an example, the memory manager 125 is arranged to read the updated first table region data structure during a garbage collection operation of the first physical block and load regions of the L2P table with an indication in the updated first table region data structure to move valid physical pages of the first physical block. The memory manager 125 then removes indications of L2P table regions from a third table data structure that are loaded and do not include a reference to a physical page in a third physical block to create an updated third table region data structure. This updated third table region data structure is then written to the array 120. Thus, as the first table region data structure was filtered when garbage collection was performed on the second block, the third table region data structure for the third physical block is filtered of stale data when garbage collection is performed on the first physical block. This cycle works to ensure that a timely and efficient filtering of stale data is performed on the table region data structures of the physical blocks.

The array controller 135 can include, among other things, circuitry or components configured to control memory operations associated with writing data to, reading data from, or erasing one or more memory cells of the memory device 110 coupled to the memory controller 115. The memory operations can be based on, for example, host commands received from the host 105, or internally generated by the memory manager 125 (e.g., in association with wear leveling, error detection or correction, etc.).

The array controller 135 can include an error correction code (ECC) component 140, which can include, among other things, an ECC engine or other circuitry configured to detect or correct errors associated with writing data to or reading data from one or more memory cells of the memory device 110 coupled to the memory controller 115. The memory controller 115 can be configured to actively detect and recover from error occurrences (e.g., bit errors, operation errors, etc.) associated with various operations or storage of data, while maintaining integrity of the data transferred between the host 105 and the memory device 110, or maintaining integrity of stored data (e.g., using redundant RAID storage, etc.), and can remove (e.g., retire) failing memory resources (e.g., memory cells, memory arrays, pages, blocks, etc.) to prevent future errors.

The memory array 120 can include several memory cells arranged in, for example, a number of devices, planes, sub-blocks, blocks, or pages. As one example, a 48 GB TLC NAND memory device can include 18,592 bytes (B) of data per page (16,384+2208 bytes), 1536 pages per block, 548 blocks per plane, and 4 or more planes per device. As another example, a 32 GB MLC memory device (storing two bits of data per cell (i.e., 4 programmable states)) can include 18,592 bytes (B) of data per page (16,384+2208 bytes), 1024 pages per block, 548 blocks per plane, and 4 planes per device, but with half the required write time and twice the program/erase (P/E) cycles as a corresponding TLC memory device. Other examples can include other numbers or arrangements. In some examples, a memory device, or a portion thereof, can be selectively operated in SLC mode, or in a desired MLC mode (such as TLC, QLC, etc.).

In operation, data is typically written to or read from the NAND memory device 110 in pages, and erased in blocks. However, one or more memory operations (e.g., read, write, erase, etc.) can be performed on larger or smaller groups of memory cells, as desired. The data transfer size of a NAND memory device 110 is typically referred to as a page, whereas the data transfer size of a host is typically referred to as a sector.

Although a page of data can include a number of bytes of user data (e.g., a data payload including a number of sectors of data) and its corresponding metadata, the size of the page often refers only to the number of bytes used to store the user data. As an example, a page of data having a page size of 4 KB can include 4 KB of user data (e.g., 8 sectors assuming a sector size of 512 B) as well as a number of bytes (e.g., 32 B, 54 B, 224 B, etc.) of metadata corresponding to the user data, such as integrity data (e.g., error detecting or correcting code data), address data (e.g., logical address data, etc.), or other metadata associated with the user data.

Different types of memory cells or memory arrays 120 can provide for different page sizes, or can require different amounts of metadata associated therewith. For example, different memory device types can have different bit error rates, which can lead to different amounts of metadata necessary to ensure integrity of the page of data (e.g., a memory device with a higher bit error rate can require more bytes of error correction code data than a memory device with a lower bit error rate). As an example, a multi-level cell (MLC) NAND flash device can have a higher bit error rate than a corresponding single-level cell (SLC) NAND flash device. As such, the MLC device can require more metadata bytes for error data than the corresponding SLC device.

Figure 2:
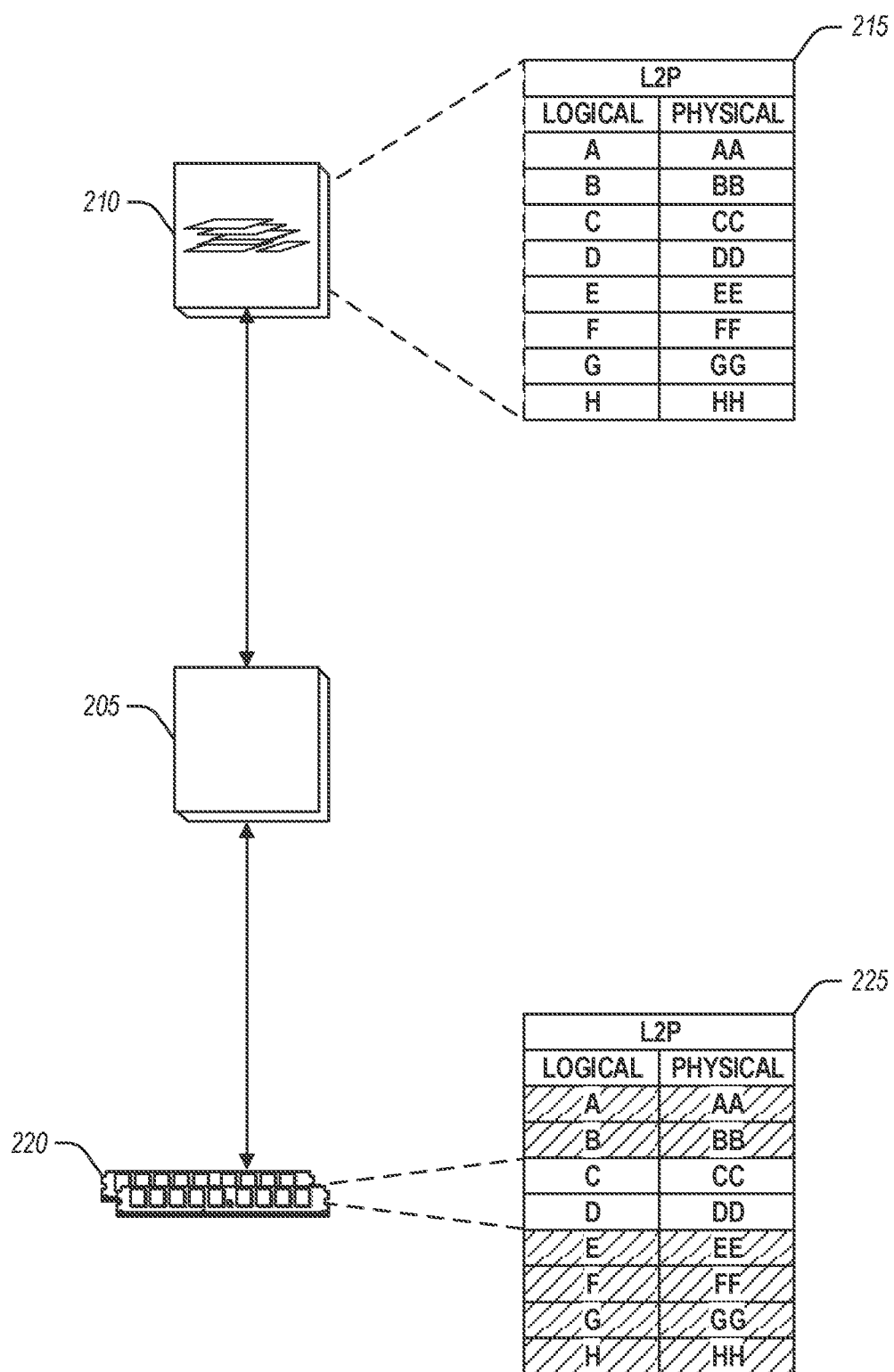
FIG. 2 illustrates an example of a logical-to-physical table region in working memory.

FIG. 2 illustrates an example of a logical-to-physical table region 225 in working memory 220. The complete L2P table 215 is stored in the NAND array 210. The complete L2P table, however, does not fit within the working memory 220. Thus, when searching the L2P table 215, processing circuitry 205 (e.g., a memory manager, memory controller, etc.) loads the L2P table region 225 from the array 210 into the working memory.

Figure 3:
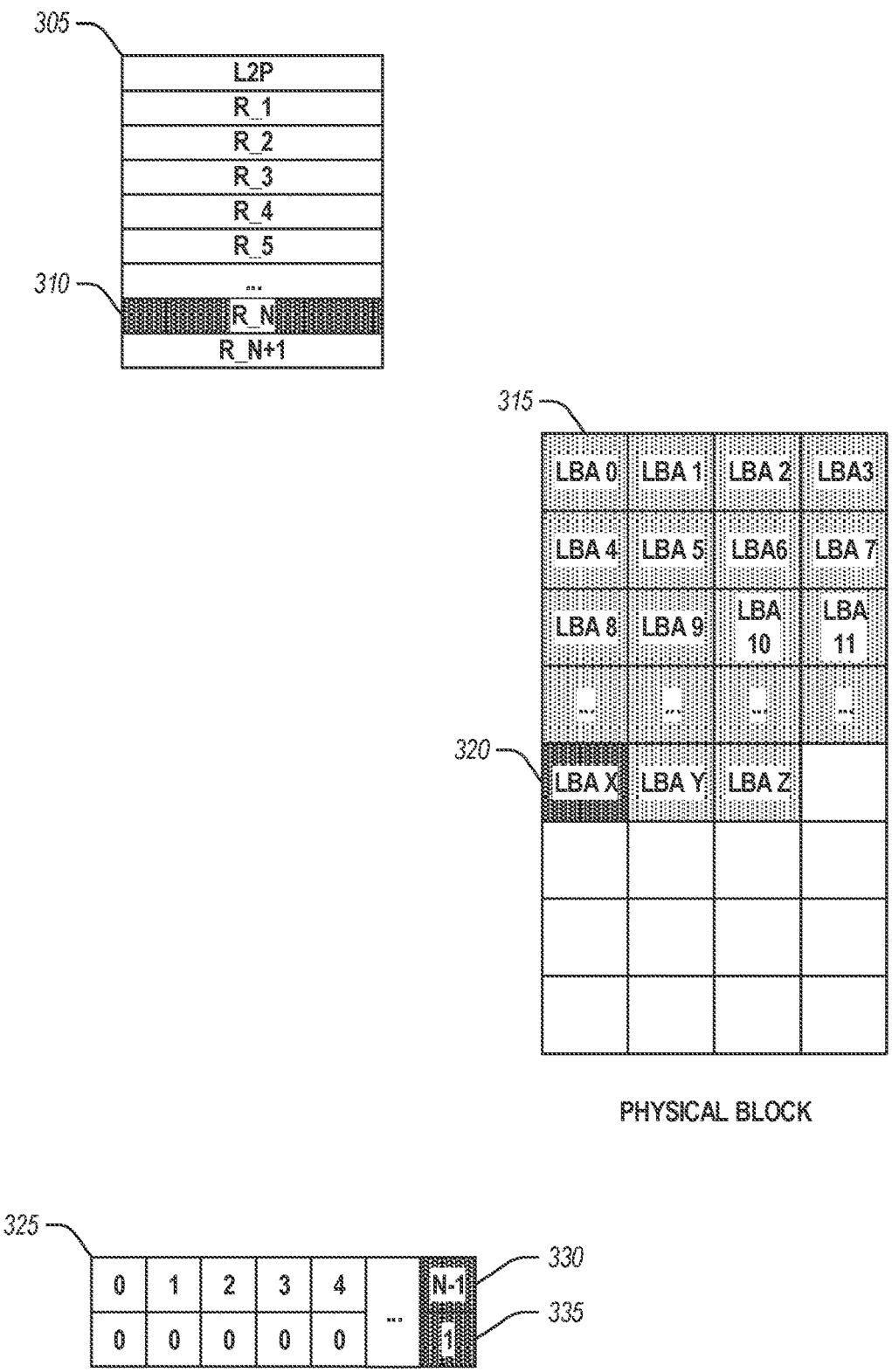
FIG. 3 illustrates an example of a relationship between a logical-to-physical region, a physical block, and a tracking data structure.

FIG. 3 illustrates an example of a relationship between a logical-to-physical region 310, a physical block 315, and a tracking data structure 325. Here, the tracking data structure is organized as a binary array with indices beginning at zero. Thus, the element of the array corresponding to a given table region (e.g., region two) is the region minus one (e.g., index one of the tracking data structure 325 corresponds to region two). Each index in the data structure 325 uniquely corresponds to a single table region in the L2P table 305. Although the bitmap or binary array structure is offered as a possible implementation of the tracking data structure, other structures may be used, such as a structured data file (e.g., extensible markup language (XML) or the like), a database, etc. Moreover, the indications may include characters or other symbols.

The relationship between these entities can be established during a host (or other) write to the block 315. The L2P table 305 is segmented into regions, including region N 310. The logical to physical page relationship is stored in region N 310. The physical page 320 in the block 315 is used to store the data for the write. The index N−1 330 corresponds to the region N 310. Thus, the array element 335 is updated to a binary '1' to indicate that the region N 310 has a relationship that pertains to the block 315; a binary '0' indicates that a corresponding region does not have a relationship that pertains to the block 315. If the block 315 fills (e.g., there are no more free pages in which to write a new request), the data structure 325 is no longer updated.

Figure 4:
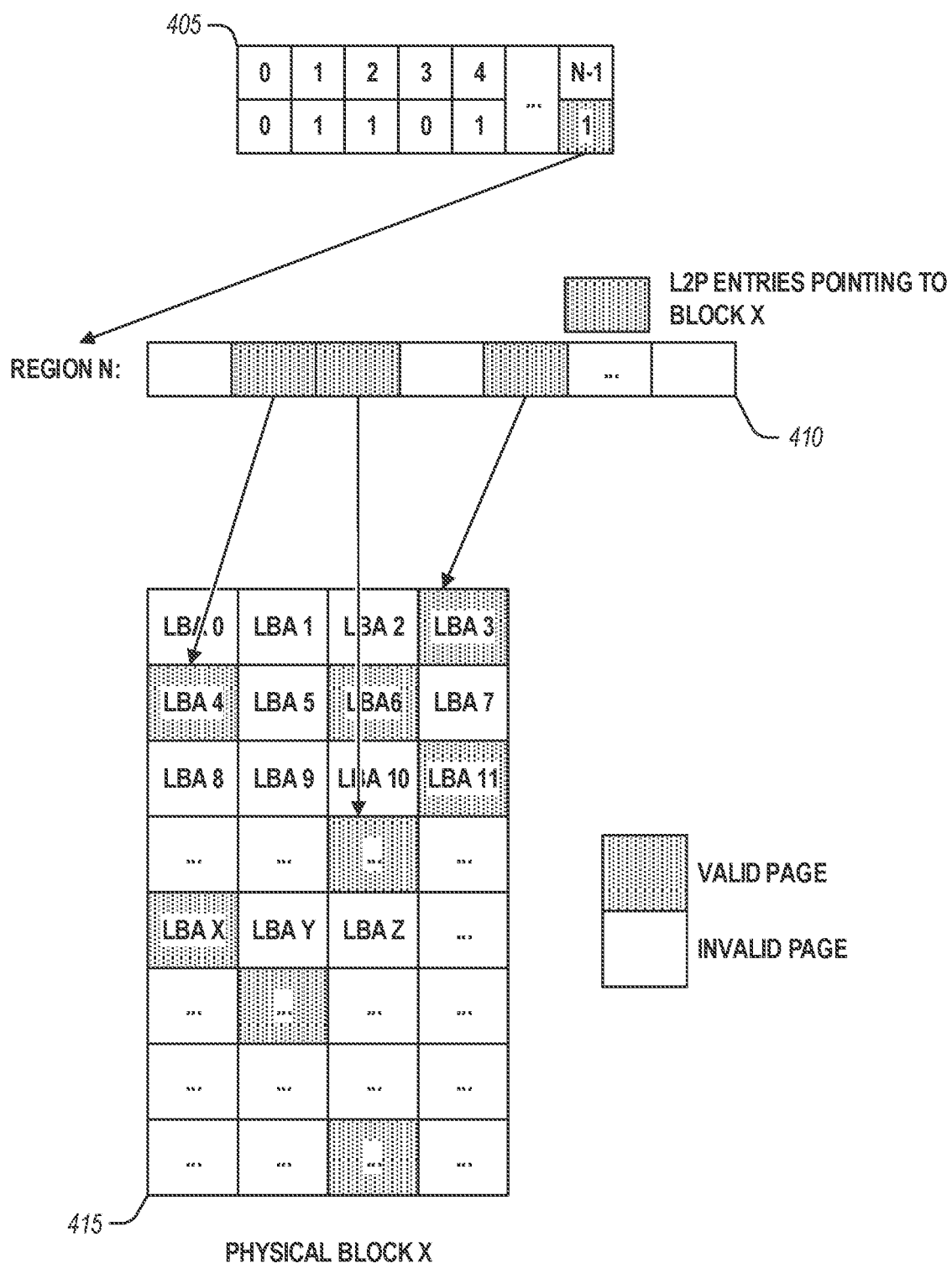
FIG. 4 illustrates an example of a relationship between a logical-to-physical region, a physical block, and a tracking data structure.

FIG. 4 illustrates an example of a relationship between a logical-to-physical region 410, a physical block 415, and a tracking data structure 405.

Here, the tracking data structure 405 is populated with indications of L2P table regions that pertain to block X 415. During garbage collection for block X 415, the tracking data structure 405 is read to determine which L2P table regions to load into working memory to complete the garbage collection. Here, the tracking data structure indicates that region N 410 has entries pertaining to block X 415.

Once loaded into working memory, the region N 410 is searched for entries that point to block X 415, such as LBA 4 and LBA 3, among others. These pages are then written to a different block and marked invalid with respect to block X 415. This process is repeated until all valid pages in block X 415 are moved, leaving block X 415 with no valid data. Block X 415 can then be erased, completing the garbage collection of block X. As noted above, the tracking data structure 405 reduces the number of L2P table regions that need to be loaded into working memory to complete the garbage collection process over traditional approaches.

Figure 5:
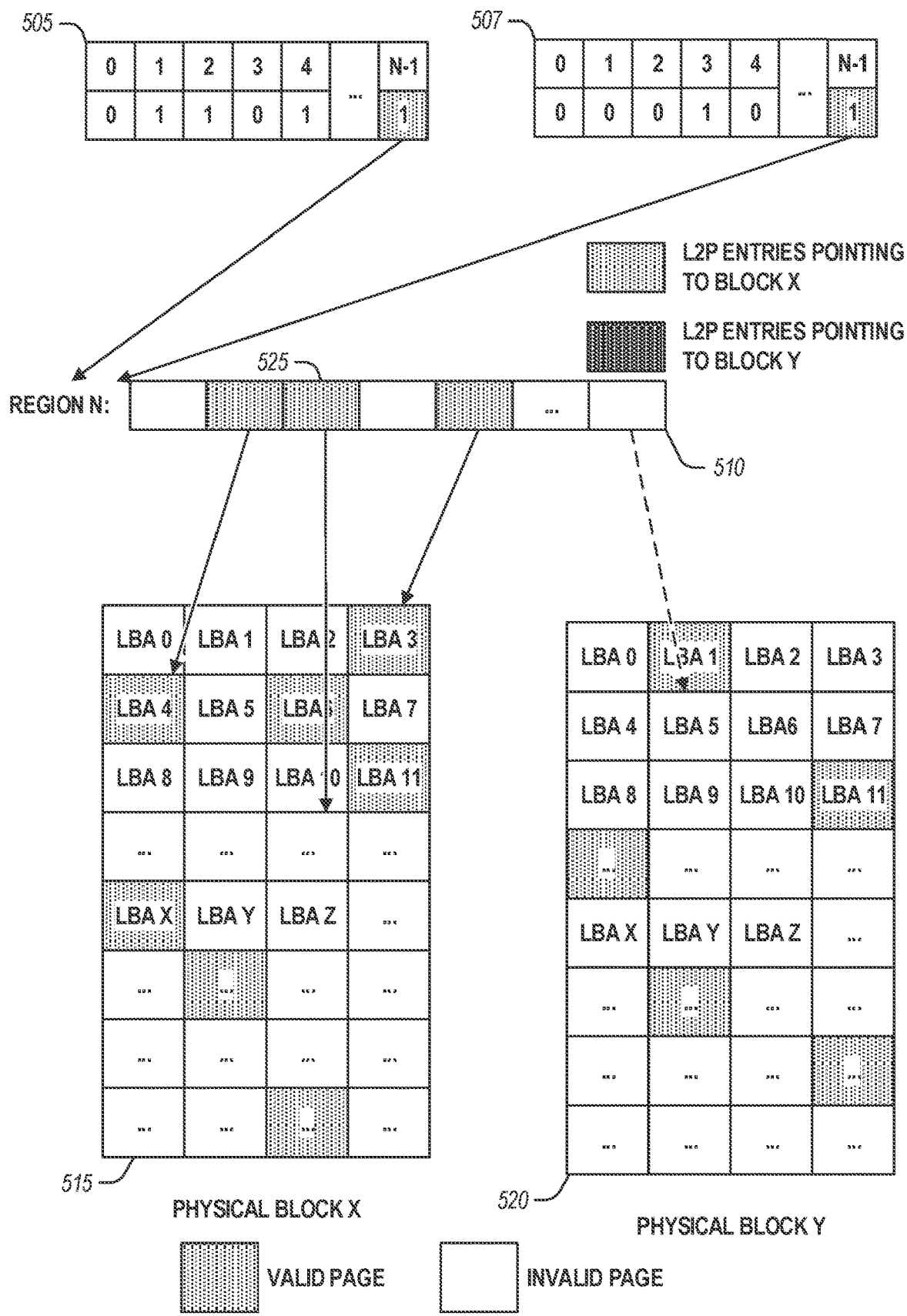
FIG. 5 illustrates an example of a relationship between a logical-to-physical region, multiple physical blocks, and tracking data structures.

FIG. 5 illustrates an example of a relationship between a logical-to-physical region 525, multiple physical blocks, and tracking data structures. Using the tracking data structure 505 as described above with respect to FIGS. 3 and 4 results in performance increases over traditional valid page search mechanisms. However, it is possible for the tracking data structures to include stale indications over time. This may occur, for example, when a page is written to a block, and then rewritten later to another block. To address this issue, the tracking data structures can be filtered to remove stale indications prior to use in garbage collection, for example. A way to efficiently filter the tracking data structures includes verifying L2P table region indications, as L2P regions are loaded into working memory to perform garbage collection on other blocks. FIG. 5 illustrates this concept.

As illustrated, the tracking data structure 505 pertains to block X 515 and tracking data structure 507 pertains to block Y 520. Each tracking data structure includes an indication for region N 525. During garbage collection of block X 515, the region N 525 is loaded into working memory-based on the tracking data structure 505—to search for valid pages to move to another block. At one time, the region N 525 also included an entry 510 pointing to block Y 520. However, as illustrated by the dashed pointer, entry 510 no longer points to block Y 520 even though the tracking data structure 507 for block Y 520 still contains an entry for region N 525. Thus, tracking data structure 507 contains a stale indication for region N 525.

The garbage collection of block X 515 is modified to read tracking data structure 507 and determine which L2P table regions from tracking data structure 507 are indicated in tracking data structure 505. For these regions, the garbage collection will check for valid pages in block Y 520 along with checking for valid pages in block X 515. If no valid page for block Y 520 is found—as is the case here for region N 525—the tracking data structure 507 is updated to remove the indication for that region, effectively filtering out all stale region indications from tracking data structure 507 that are shared with tracking data structure 505. In an example, the garbage collection of block X 515 can also load L2P regions indicated in tracking data structure 507 that are not shared with tracking data structure 505 to ensure that all stale indications are expunged from tracking data structure 507. This approach trades some additional latency in the block X 515 garbage collection for reduced latency in a future block Y 520 garbage collection.

Figure 6A:
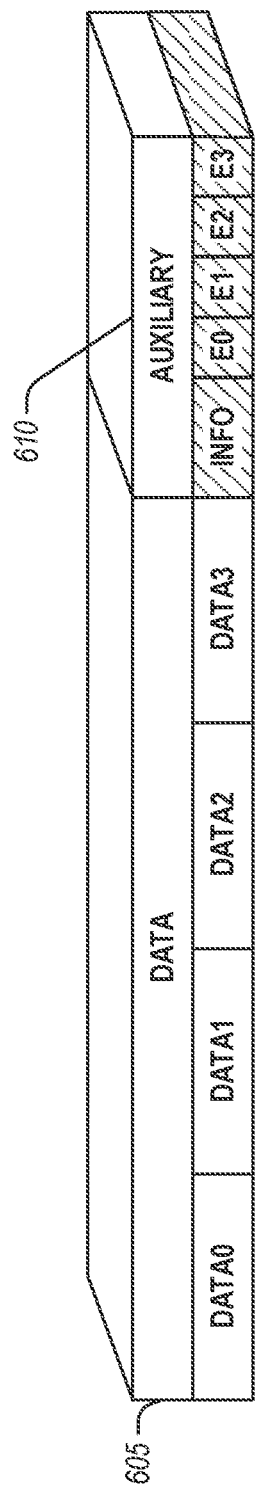
FIGS. 6A-6B illustrate storage configurations for a tracking data structure.
Figure 6B:
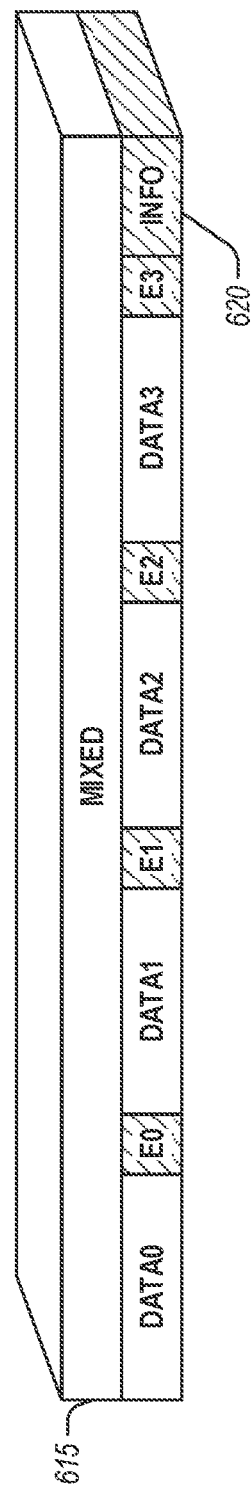

FIGS. 6A-6B illustrate storage configurations for a verification component in a block. FIG. 6A illustrates an organization where a dedicated portion of the block is set-aside for controller metadata. Thus, the block is divided in the user data portion 605 and the auxiliary portion 610. The table region data structure can be stored in the auxiliary portion, such as in the segment marked "INFO." In contrast, FIG. 6B illustrates an alternative organization in which the auxiliary portions are interspersed throughout the user data segments, resulting in a heterogeneous portion 615. However, the "INFO" auxiliary portions 620 are still located on the block and can store the table region data structure of the block when it was last written. Other locations that may be used to store table region data structures include areas of the memory device reserved for device management.

Figure 7:
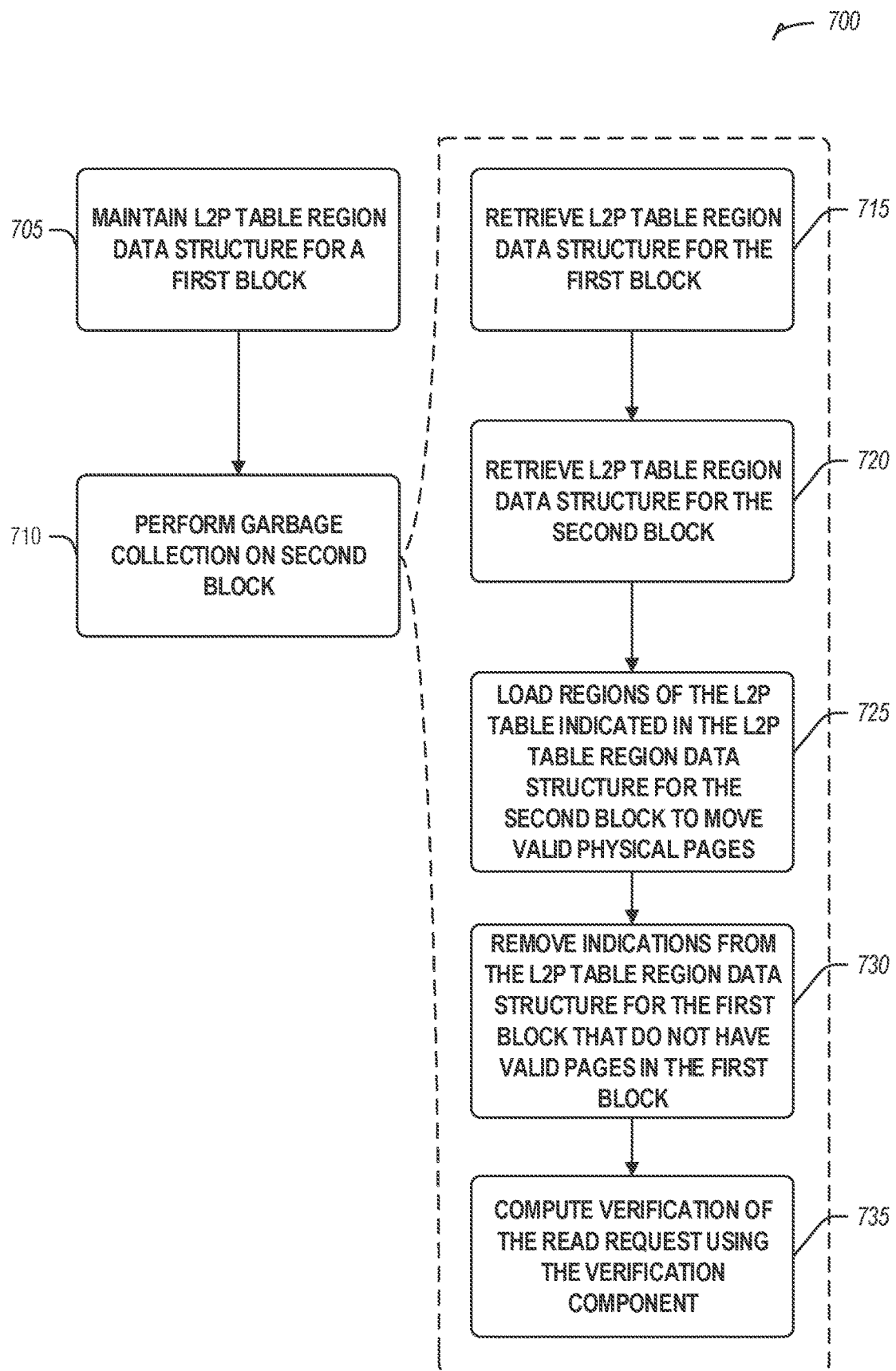
FIG. 7 illustrates a flowchart of a method for synchronizing NAND logical-to-physical table region tracking.

FIG. 7 illustrates a flowchart of a method 700 for synchronizing NAND logical-to-physical table region tracking. Operations of the method 700 are performed by electronic hardware, such as that described herein (e.g., circuitry).

At operation 705, a first table region data structure is maintained for a first physical block of a NAND device. In an example, the table region data structure includes indications of logical-to-physical mapping table regions—of a logical-to-physical mapping table—that contain a logical page mapping to a physical page of the physical block. In an example, the NAND device includes a working memory, the logical-to-physical mapping table is larger than the working memory, and any one of logical-to-physical mapping table regions is not larger than the working memory.

At operation 710, garbage collection is performed on a second physical block of the NAND device. Operations 715-735 provide details of the garbage collection to filter the first table region data structure.

At operation 715, the first table region data structure is read. In an example, the first table region data structure is stored in the first physical block.

At operation 720, a second table region data structure for the second physical block is read.

At operation 725, regions of the logical-to-physical mapping table with an indication in the second table region data structure are loaded to move valid physical pages of the second physical block. In an example, a table region data structure is a bitmap. In an example, the bitmap includes a bit for each region of multiple, mutually exclusive, regions that span the logical-to-physical mapping table. In an example, the indications of the logical-to-physical mapping table regions are a logical one in a respective bit. In an example, the logical-to-physical mapping table regions are ordered. Here, an index of the bit corresponds to an order of a logical-to-physical mapping table region.

At operation 730, indications are removed of the logical-to-physical mapping table regions from the first table data structure that are loaded and do not include a reference to a physical page in the first physical block to create an updated first table region data structure. In an example, the garbage collection includes loading, prior to creating the updated first table region data structure, regions of the logical-to-physical mapping table with an indication in the first table region data structure and no indication in the second table region data structure.

At operation 735, the updated first table region data structure is written to the NAND device.

In an example, unillustrated operations of the method 700 can include erasing the second physical block after the valid physical pages of the second physical block are moved. The second table region data structure is then initialized in response to erasing the second physical block. In an example, the second table region data structure is initialized in response to a write (e.g., to prepare for a write) rather than in response to erasing the second physical block. In an example, the table region data structure is a bitmap and initializing the data structure includes writing logical zeros in each bit of the bitmap.

In an example, unillustrated operations of the method 700 can include reading the updated first table region data structure during a garbage collection operation of the first physical block. Regions of the logical-to-physical mapping table with an indication in the updated first table region data structure can then be loaded to move valid physical pages of the first physical block. Indications of the logical-to-physical mapping table regions can then be removed from a third table data structure that are loaded and do not include a reference to a physical page in a third physical block to create an updated third table region data structure. This updated third table region data structure is then written to the NAND device.

Figure 8:
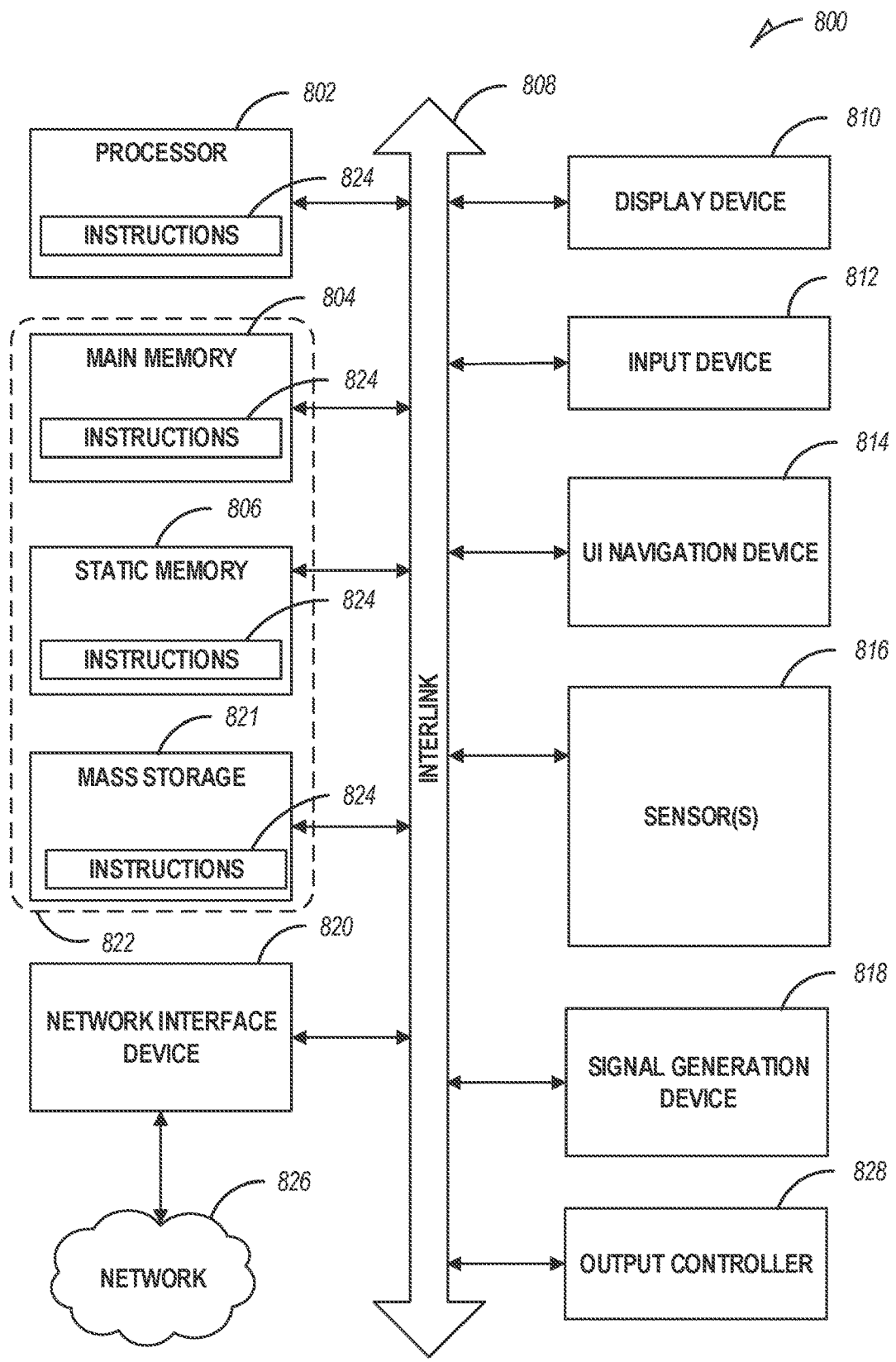
FIG. 8 is a block diagram illustrating an example of a machine upon which one or more embodiments can be implemented.

FIG. 8 illustrates a block diagram of an example machine 800 upon which any one or more of the techniques (e.g., methodologies) discussed herein can perform. In alternative embodiments, the machine 800 can operate as a standalone device or can be connected (e.g., networked) to other machines. In a networked deployment, the machine 800 can operate in the capacity of a server machine, a client machine, or both in server-client network environments. In an example, the machine 800 can act as a peer machine in peer-to-peer (P2P) (or other distributed) network environment. The machine 800 can be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, can include, or can operate by, logic, components, devices, packages, or mechanisms. Circuitry is a collection (e.g., set) of circuits implemented in tangible entities that include hardware (e.g., simple circuits, gates, logic, etc.). Circuitry membership can be flexible over time and underlying hardware variability. Circuitries include members that can, alone or in combination, perform specific tasks when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer readable medium is communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time.

The machine (e.g., computer system) 800 (e.g., the host device 105, the memory device 110, etc.) can include a hardware processor 802 (e.g., a central processing unit (CPU), a graphics processing unit (GPU), a hardware processor core, or any combination thereof, such as the memory controller 115, etc.), a main memory 804 and a static memory 806, some or all of which can communicate with each other via an interlink (e.g., bus) 808. The machine 800 can further include a display unit 810, an alphanumeric input device 812 (e.g., a keyboard), and a user interface (UI) navigation device 814 (e.g., a mouse). In an example, the display unit 810, input device 812 and UI navigation device 814 can be a touch screen display. The machine 800 can additionally include a storage device (e.g., drive unit) 816, a signal generation device 818 (e.g., a speaker), a network interface device 820, and one or more sensors 816, such as a global positioning system (GPS) sensor, compass, accelerometer, or other sensor. The machine 800 can include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 can include a machine readable medium 822 on which is stored one or more sets of data structures or instructions 824 (e.g., software) embodying or utilized by any one or more of the techniques or functions described herein. The instructions 824 can also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 can constitute the machine readable medium 822.

While the machine readable medium 822 is illustrated as a single medium, the term "machine readable medium" can include a single medium or multiple media (e.g., a centralized or distributed database, or associated caches and servers) configured to store the one or more instructions 824.

The term "machine readable medium" can include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples can include solid-state memories, and optical and magnetic media. In an example, a massed machine readable medium comprises a machine-readable medium with a plurality of particles having invariant (e.g., rest) mass. Accordingly, massed machine-readable media are not transitory propagating signals. Specific examples of massed machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 (e.g., software, programs, an operating system (OS), etc.) or other data are stored on the storage device 821, can be accessed by the memory 804 for use by the processor 802. The memory 804 (e.g., DRAM) is typically fast, but volatile, and thus a different type of storage than the storage device 821 (e.g., an SSD), which is suitable for long-term storage, including while in an "off"

condition. The instructions 824 or data in use by a user or the machine 800 are typically loaded in the memory 804 for use by the processor 802. When the memory 804 is full, virtual space from the storage device 821 can be allocated to supplement the memory 804; however, because the storage 821 device is typically slower than the memory 804, and write speeds are typically at least twice as slow as read speeds, use of virtual memory can greatly reduce user experience due to storage device latency (in contrast to the memory 804, e.g., DRAM). Further, use of the storage device 821 for virtual memory can greatly reduce the usable lifespan of the storage device 821.

In contrast to virtual memory, virtual memory compression (e.g., the Linux® kernel feature "ZRAM") uses part of the memory as compressed block storage to avoid paging to the storage device 821. Paging takes place in the compressed block until it is necessary to write such data to the storage device 821. Virtual memory compression increases the usable size of memory 804, while reducing wear on the storage device 821.

Storage devices optimized for mobile electronic devices, or mobile storage, traditionally include MMC solid-state storage devices (e.g., micro Secure Digital (microSD™) cards, etc.). MMC devices include a number of parallel interfaces (e.g., an 8-bit parallel interface) with a host device, and are often removable and separate components from the host device. In contrast, eMMC™ devices are attached to a circuit board and considered a component of the host device, with read speeds that rival serial ATA™ (Serial AT (Advanced Technology) Attachment, or SATA) based SSD devices. However, demand for mobile device performance continues to increase, such as to fully enable virtual or augmented-reality devices, utilize increasing networks speeds, etc. In response to this demand, storage devices have shifted from parallel to serial communication interfaces. Universal Flash Storage (UFS) devices, including controllers and firmware, communicate with a host device using a low-voltage differential signaling (LVDS) serial interface with dedicated read/write paths, further advancing greater read/write speeds.

The instructions 824 can further be transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 820 can include one or more physical jacks (e.g., Ethernet, coaxial, or phone jacks) or one or more antennas to connect to the communications network 826. In an example, the network interface device 820 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software.

Additional Examples

Example 1 is a NAND device for synchronizing NAND logical-to-physical table region tracking, the NAND device comprising: a NAND array; and a controller to: maintain a first table region data structure for a first physical block of the NAND array, the table region data structure including indications of logical-to-physical mapping table regions, of a logical-to-physical mapping table, that contain a logical page mapping to a physical page of the physical block; perform garbage collection on a second physical block of the NAN D array, to perform the garbage collection, the controller is to: read the first table region data structure; read a second table region data structure for the second physical block; load regions of the logical-to-physical mapping table with an indication in the second table region data structure to move valid physical pages of the second physical block; recmove indications of the logical-to-physical mapping table regions from the first table data structure that are loaded and do not include, a reference to a physical page in the first physical block to create an updated first table region data structure; and write the updated first table region data structure to the NAND array.

In Example 2, the subject matter of Example 1 includes, wherein a table region data structure is a bitmap.

In Example 3, the subject matter of Example 2 includes, wherein the bitmap includes a bit for each region of multiple, mutually exclusive, regions that span the logical-to-physical mapping table.

In Example 4, the subject matter of Example 3 includes, wherein the indications of the logical-to-physical mapping table regions are a logical one in a respective bit.

In Example 5, the subject matter of Examples 3-4 includes, wherein the logical-to-physical mapping table regions are ordered, and wherein an index of the bit corresponds to an order of a logical-to-physical mapping table region.

In Example 6, the subject matter of Examples 1-5 includes, wherein the first table region data structure is stored in the first physical block.

In Example 7, the subject matter of Examples 1-6 includes, a working memory, wherein the logical-to-physical mapping table is larger than the working memory, and wherein any one of logical-to-physical mapping table regions is not larger than the working memory.

In Example 8, the subject matter of Examples 1-7 includes, wherein, to perform the garbage collection, the controller is to load, prior to creation of the updated first table region data structure, regions of the logical-to-physical mapping table with an indication in the first table region data structure and no indication in the second table region data structure.

In Example 9, the subject matter of Examples 1-8 includes, wherein the controller is to erase the second physical block after the valid physical pages of the second physical block are moved.

In Example 10, the subject matter of Example 9 includes, wherein the data structure is a bitmap, and wherein initializing the data structure includes writing logical zeros in each bit of the bitmap.

In Example 11, the subject matter of Examples 1-10 includes, wherein the controller is to: read the updated first table region data structure during a garbage collection operation of the first physical block; load regions of the logical-to-physical mapping table with an indication in the updated first table region data structure to move valid physical pages of the first physical block; remove indications of the logical-to-physical mapping table regions from a third table data structure that are loaded and do not include a reference to a physical page in a third physical block to create an updated third table region data structure; and write the updated third table region data structure to the NAND array.

Example 12 is a method for synchronizing NAND logical-to-physical table region tracking, the method comprising: maintaining a first table region data structure for a first physical block of a NAND device, the table region data structure including indications of logical-to-physical mapping table regions, of a logical-to-physical mapping table, that contain a logical page mapping to a physical page of the physical block; performing garbage collection on a second physical block of the NAND device, the garbage collection including: reading the first table region data structure; reading a second table region data structure for the second physical block; loading regions of the logical-to-physical mapping table with an indication in the second table region data structure to move valid physical pages of the second physical block; removing indications of the logical-to-physical mapping table regions from the first table data structure that are loaded and do not include, a reference to a physical page in the first physical block to create an updated first table region data structure; and writing the updated first table region data structure to the NAND device.

In Example 13, the subject matter of Example 12 includes, wherein a table region data structure is a bitmap.

In Example 14, the subject matter of Example 13 includes, wherein the bitmap includes a bit for each region of multiple, mutually exclusive, regions that span the logical-to-physical mapping table.

In Example 15, the subject matter of Example 14 includes, wherein the indications of the logical-to-physical mapping table regions are a logical one in a respective bit.

In Example 16, the subject matter of Examples 14-15 includes, wherein the logical-to-physical mapping table regions are ordered, and wherein an index of the bit corresponds to an order of a logical-to-physical mapping table region.

In Example 17, the subject matter of Examples 12-16 includes, wherein the first table region data structure is stored in the first physical block.

In Example 18, the subject matter of Examples 12-17 includes, wherein the NAND device includes a working memory, wherein the logical-to-physical mapping table is larger than the working memory, and wherein any one of logical-to-physical mapping table regions is not larger than the working memory.

In Example 19, the subject matter of Examples 12-18 includes, wherein the garbage collection includes loading, prior to creating the updated first table region data structure, regions of the logical-to-physical mapping table with an indication in the first table region data structure and no indication in the second table region data structure.

In Example 20, the subject matter of Examples 12-19 includes, erasing the second physical block after the valid physical pages of the second physical block are moved.

In Example 21, the subject matter of Example 20 includes, wherein the data structure is a bitmap, and wherein initializing the data structure includes writing logical zeros in each bit of the bitmap.

In Example 22, the subject matter of Examples 12-21 includes, reading the updated first table region data structure during a garbage collection operation of the first physical block; loading regions of the logical-to-physical mapping table with an indication in the updated first table region data structure to move valid physical pages of the first physical block; removing indications of the logical-to-physical mapping table regions from a third table data structure that are loaded and do not include a reference to a physical page in a third physical block to create an updated third table region data structure; and writing the updated third table region data structure to the NAND device.

Example 23 is a machine readable medium including instructions for synchronizing NAND logical-to-physical table region tracking, the instructions, when executed by a machine, cause the machine to perform operations comprising: maintaining a first table region data structure for a first physical block of a NAND device, the table region data structure including indications of logical-to-physical mapping table regions, of a logical-to-physical mapping table, that contain a logical page mapping to a physical page of the physical block; performing garbage collection on a second physical block of the NAND device, the garbage collection including: reading the first table region data structure; reading a second table region data structure for the second physical block; loading regions of the logical-to-physical mapping table with an indication in the second table region data structure to move valid physical pages of the second physical block; removing indications of the logical-to-physical mapping table regions from the first table data structure that are loaded and do not include, a reference to a physical page in the first physical block to create an updated first table region data structure; and writing the updated first table region data structure to the NAND device.

In Example 24, the subject matter of Example 23 includes, wherein a table region data structure is a bitmap.

In Example 25, the subject matter of Example 24 includes, wherein the bitmap includes a bit for each region of multiple, mutually exclusive, regions that span the logical-to-physical mapping table.

In Example 26, the subject matter of Example 25 includes, wherein the indications of the logical-to-physical mapping table regions are a logical one in a respective bit.

In Example 27, the subject matter of Examples 25-26 includes, wherein the logical-to-physical mapping table regions are ordered, and wherein an index of the bit corresponds to an order of a logical-to-physical mapping table region.

In Example 28, the subject matter of Examples 23-27 includes, wherein the first table region data structure is stored in the first physical block.

In Example 29, the subject matter of Examples 23-28 includes, wherein the NAND device includes a working memory, wherein the logical-to-physical mapping table is larger than the working memory, and wherein any one of logical-to-physical mapping table regions is not larger than the working memory.

In Example 30, the subject matter of Examples 23-29 includes, wherein the garbage collection includes loading, prior to creating the updated first table region data structure, regions of the logical-to-physical mapping table with an indication in the first table region data structure and no indication in the second table region data structure.

In Example 31, the subject matter of Examples 23-30 includes, wherein the operations comprise erasing the second physical block after the valid physical pages of the second physical block are moved.

In Example 32, the subject matter of Example 31 includes, wherein the data structure is a bitmap, and wherein initializing the data structure includes writing logical zeros in each bit of the bitmap.

In Example 33, the subject matter of Examples 23-32 includes, wherein the operations comprise: reading the updated first table region data structure during a garbage collection operation of the first physical block; loading regions of the logical-to-physical mapping table with an indication in the updated first table region data structure to move valid physical pages of the first physical block; removing indications of the logical-to-physical mapping table regions from a third table data structure that are loaded and do not include a reference to a physical page in a third physical block to create an updated third table region data structure; and writing the updated third table region data structure to the NAND device.

Example 34 is a system for synchronizing NAND logical-to-physical table region tracking, the system comprising: means for maintaining a first table region data structure for a first physical block of a NAND device, the table region data structure including indications of logical-to-physical mapping table regions, of a logical-to-physical mapping table, that contain a logical page mapping to a physical page of the physical block; means for performing garbage collection on a second physical block of the NAND device, the garbage collection including: reading the first table region data structure; reading a second table region data structure for the second physical block; loading regions of the logical-to-physical mapping table with an indication in the second table region data structure to move valid physical pages of the second physical block; removing indications of the logical-to-physical mapping table regions from the first table data structure that are loaded and do not include, a reference to a physical page in the first physical block to create an updated first table region data structure; and writing the updated first table region data structure to the NAND device.

In Example 35, the subject matter of Example 34 includes, wherein a table region data structure is a bitmap.

In Example 36, the subject matter of Example 35 includes, wherein the bitmap includes a bit for each region of multiple, mutually exclusive, regions that span the logical-to-physical mapping table.

In Example 37, the subject matter of Example 36 includes, wherein the indications of the logical-to-physical mapping table regions are a logical one in a respective bit.

In Example 38, the subject matter of Examples 36-37 includes, wherein the logical-to-physical mapping table regions are ordered, and wherein an index of the bit corresponds to an order of a logical-to-physical mapping table region.

In Example 39, the subject matter of Examples 34-38 includes, wherein the first table region data structure is stored in the first physical block.

In Example 40, the subject matter of Examples 34-39 includes, wherein the NAND device includes a working memory, wherein the logical-to-physical mapping table is larger than the working memory, and wherein any one of logical-to-physical mapping table regions is not larger than the working memory.

In Example 41, the subject matter of Examples 34-40 includes, wherein the garbage collection includes loading, prior to creating the updated first table region data structure, regions of the logical-to-physical mapping table with an indication in the first table region data structure and no indication in the second table region data structure.

In Example 42, the subject matter of Examples 34-41 includes, means for erasing the second physical block after the valid physical pages of the second physical block are moved.

In Example 43, the subject matter of Example 42 includes, wherein the data structure is a bitmap, and wherein initializing the data structure includes writing logical zeros in each bit of the bitmap.

In Example 44, the subject matter of Examples 34-43 includes, means for reading the updated first table region data structure during a garbage collection operation of the first physical block; means for loading regions of the logical-to-physical mapping table with an indication in the updated first table region data structure to move valid physical pages of the first physical block; means for removing indications of the logical-to-physical mapping table regions from a third table data structure that are loaded and do not include a reference to a physical page in a third physical block to create an updated third table region data structure; and means for writing the updated third table region data structure to the NAND device.

Example 45 is at least one machine-readable medium including instructions that, when executed by processing circuitry, cause the processing circuitry to perform operations to implement of any of Examples 1-44.

Example 46 is an apparatus comprising means to implement of any of Examples 1-44.

Example 47 is a system to implement of any of Examples 1-44.

Example 48 is a method to implement of any of Examples 1-44.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" can include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

The term "horizontal" as used in this document is defined as a plane parallel to the conventional plane or surface of a substrate, such as that underlying a wafer or die, regardless of the actual orientation of the substrate at any point in time. The term "vertical" refers to a direction perpendicular to the horizontal as defined above. Prepositions, such as "on," "over," and "under" are defined with respect to the conventional plane or surface being on the top or exposed surface of the substrate, regardless of the orientation of the substrate; and while "on" is intended to suggest a direct contact of one structure relative to another structure which it lies "on" (in the absence of an express indication to the contrary); the terms "over" and "under" are expressly intended to identify a relative placement of structures (or layers, features, etc.), which expressly includes—but is not limited to—direct contact between the identified structures unless specifically identified as such. Similarly, the terms "over" and "under" are not limited to horizontal orientations, as a structure can be "over" a referenced structure if it is, at some point in time, an outermost portion of the construction under discussion, even if such structure extends vertically relative to the referenced structure, rather than in a horizontal orientation.

The terms "wafer" and "substrate" are used herein to refer generally to any structure on which integrated circuits are formed, and also to such structures during various stages of integrated circuit fabrication. The following detailed description is, therefore, not to be taken in a limiting sense, and the scope of the various embodiments is defined only by the appended claims, along with the full scope of equivalents to which such claims are entitled.

Various embodiments according to the present disclosure and described herein include memory utilizing a vertical structure of memory cells (e.g., NAND strings of memory cells). As used herein, directional adjectives will be taken relative a surface of a substrate upon which the memory cells are formed (i.e., a vertical structure will be taken as extending away from the substrate surface, a bottom end of the vertical structure will be taken as the end nearest the substrate surface and a top end of the vertical structure will be taken as the end farthest from the substrate surface).

As used herein, directional adjectives, such as horizontal, vertical, normal, parallel, perpendicular, etc., can refer to relative orientations, and are not intended to require strict adherence to specific geometric properties, unless otherwise noted. For example, as used herein, a vertical structure need not be strictly perpendicular to a surface of a substrate, but can instead be generally perpendicular to the surface of the substrate, and can form an acute angle with the surface of the substrate (e.g., between 60 and 120 degrees, etc.).

In some embodiments described herein, different doping configurations can be applied to a source-side select gate (SGS), a control gate (CG), and a drain-side select gate (SGD), each of which, in this example, can be formed of or at least include polysilicon, with the result such that these tiers (e.g., polysilicon, etc.) can have different etch rates when exposed to an etching solution. For example, in a process of forming a monolithic pillar in a 3D semiconductor device, the SGS and the CG can form recesses, while the SGD can remain less recessed or even not recessed. These doping configurations can thus enable selective etching into the distinct tiers (e.g., SGS, CG, and SGD) in the 3D semiconductor device by using an etching solution (e.g., tetramethylammonium hydroxide (TMCH)).

Operating a memory cell, as used herein, includes reading from, writing to, or erasing the memory cell. The operation of placing a memory cell in an intended state is referred to herein as "programming," and can include both writing to or erasing from the memory cell (e.g., the memory cell can be programmed to an erased state).

According to one or more embodiments of the present disclosure, a memory controller (e.g., a processor, controller, firmware, etc.) located internal or external to a memory device, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the memory device as they occur, tracking the operations of the memory device it initiates, evaluating the memory device characteristics corresponding to a wear state, etc.)

According to one or more embodiments of the present disclosure, a memory access device can be configured to provide wear cycle information to the memory device with each memory operation. The memory device control circuitry (e.g., control logic) can be programmed to compensate for memory device performance changes corresponding to the wear cycle information. The memory device can receive the wear cycle information and determine one or more operating parameters (e.g., a value, characteristic) in response to the wear cycle information.

It will be understood that when an element is referred to as being "on," "connected to" or "coupled with" another element, it can be directly on, connected, or coupled with the other element or intervening elements can be present. In contrast, when an element is referred to as being "directly on," "directly connected to" or "directly coupled with" another element, there are no intervening elements or layers present. If two elements are shown in the drawings with a line connecting them, the two elements can be either be coupled, or directly coupled, unless otherwise indicated.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code can form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact discs and digital video disks), magnetic cassettes, memory cards or sticks, random access memories (RAMs), read only memories (ROMs), solid state drives (SSDs), Universal Flash Storage (UFS) device, embedded MMC (eMMC) device, and the like.

The above description is intended to be illustrative, and not restrictive. For example, the above-described examples (or one or more aspects thereof) can be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A NAND device for synchronizing NAND logical-to-physical table region tracking, the NAND device comprising:
 a NAND array; and
 a controller to:
  maintain a first table region data structure for a first physical block of the NAND array, the table region data structure including indications of logical-to-physical mapping table regions, of a logical-to-physical mapping table, that contain a logical page mapping to a physical page of the physical block;
  perform garbage collection on a second physical block of the NAND array, to perform the garbage collection, the controller is to:
   read the first table region data structure;
   read a second table region data structure for the second physical block;
   load regions of the logical-to-physical mapping table with an indication in the second table region data structure to move valid physical pages of the second physical block;
   remove indications of the logical-to-physical mapping table regions from the first table data structure that are loaded and do not include a reference to a physical page in the first physical block to create an updated first table region data structure; and
   write the updated first table region data structure to the NAND array.

2. The NAND device of claim 1, wherein a table region data structure is a bitmap.

3. The NAND device of claim 2, wherein the bitmap includes a bit for each region of multiple, mutually exclusive, regions that span the logical-to-physical mapping table.

4. The NAND device of claim 3, wherein the indications of the logical-to-physical mapping table regions are a logical one in a respective bit.

5. The NAND device of claim 3, wherein the logical-to-physical mapping table regions are ordered, and wherein an index of the bit corresponds to an order of a logical-to-physical mapping table region.

6. The NAND device of claim 1, wherein the first table region data structure is stored in the first physical block.

7. The NAND device of claim 1, comprising a working memory, wherein the logical-to-physical mapping table is larger than the working memory, and wherein any one of logical-to-physical mapping table regions is not larger than the working memory.

8. The NAND device of claim 1 wherein, to perform the garbage collection, the controller is to load, prior to creation of the updated first table region data structure, regions of the logical-to-physical mapping table with an indication in the first table region data structure and no indication in the second table region data structure.

9. The NAND device of claim 1, wherein the controller is to erase the second physical block after the valid physical pages of the second physical block are moved.

10. The NAND device of claim 9, wherein the data structure is a bitmap, and wherein initializing the data structure includes writing logical zeros in each bit of the bitmap.

11. The NAND device of claim 1, wherein the controller is to:
 read the updated first table region data structure during a garbage collection operation of the first physical block;
 load regions of the logical-to-physical mapping table with an indication in the updated first table region data structure to move valid physical pages of the first physical block;
 remove indications of the logical-to-physical mapping table regions from a third table data structure that are loaded and do not include a reference to a physical page in a third physical block to create an updated third table region data structure; and
 write the updated third table region data structure to the NAND array.

12. A method for synchronizing NAND logical-to-physical table region tracking, the method comprising:
 maintaining a first table region data structure for a first physical block of a NAND device, the table region data structure including indications of logical-to-physical mapping table regions, of a logical-to-physical mapping table, that contain a logical page mapping to a physical page of the physical block;
 performing garbage collection on a second physical block of the NAND device, the garbage collection including:
  reading the first table region data structure;
  reading a second table region data structure for the second physical block;
  loading regions of the logical-to-physical mapping table with an indication in the second table region data structure to move valid physical pages of the second physical block;
  removing indications of the logical-to-physical mapping table regions from the first table data structure that are loaded and do not include a reference to a physical page in the first physical block to create an updated first table region data structure; and
  writing the updated first table region data structure to the NAND device.

13. The method of claim 12, wherein a table region data structure is a bitmap.

14. The method of claim 13, wherein the bitmap includes a bit for each region of multiple, mutually exclusive, regions that span the logical-to-physical mapping table.

15. The method of claim 14, wherein the indications of the logical-to-physical mapping table regions are a logical one in a respective bit.

16. The method of claim 14, wherein the logical-to-physical mapping table regions are ordered, and wherein an index of the bit corresponds to an order of a logical-to-physical mapping table region.

17. The method of claim 12, wherein the first table region data structure is stored in the first physical block.

18. The method of claim 12, wherein the NAND device includes a working memory, wherein the logical-to-physical mapping table is larger than the working memory, and wherein any one of logical-to-physical mapping table regions is not larger than the working memory.

19. The method of claim 12 wherein the garbage collection includes loading, prior to creating the updated first table region data structure, regions of the logical-to-physical mapping table with an indication in the first table region data structure and no indication in the second table region data structure.

20. The method of claim 12, comprising erasing the second physical block after the valid physical pages of the second physical block are moved.

21. A non-transitory machine readable medium including instructions for synchronizing NAND logical-to-physical table region tracking, the instructions, when executed by a machine, cause the machine to perform operations comprising:
  maintaining a first table region data structure for a first physical block of a NAND device, the table region data structure including indications of logical-to-physical mapping table regions, of a logical-to-physical mapping table, that contain a logical page mapping to a physical page of the physical block;
  performing garbage collection on a second physical block of the NAND device, the garbage collection including:
    reading the first table region data structure;
    reading a second table region data structure for the second physical block;
    loading regions of the logical-to-physical mapping table with an indication in the second table region data structure to move valid physical pages of the second physical block;
    removing indications of the logical-to-physical mapping table regions from the first table data structure that are loaded and do not include a reference to a physical page in the first physical block to create an updated first table region data structure; and
    writing the updated first table region data structure to the NAND device.

22. The non-transitory machine readable medium of claim 21, wherein a table region data structure is a bitmap.

23. The non-transitory machine readable medium of claim 22, wherein the bitmap includes a bit for each region of multiple, mutually exclusive, regions that span the logical-to-physical mapping table.

24. The non-transitory machine readable medium of claim 23, wherein the indications of the logical-to-physical mapping table regions are a logical one in a respective bit.

25. The non-transitory machine readable medium of claim 23, wherein the logical-to-physical mapping table regions are ordered, and wherein an index of the bit corresponds to an order of a logical-to-physical mapping table region.

26. The non-transitory machine readable medium of claim 21, wherein the first table region data structure is stored in the first physical block.

27. The non-transitory machine readable medium of claim 21, wherein the NAND device includes a working memory, wherein the logical-to-physical mapping table is larger than the working memory, and wherein any one of logical-to-physical mapping table regions is not larger than the working memory.

28. The non-transitory machine readable medium of claim 21 wherein the garbage collection includes loading, prior to creating the updated first table region data structure, regions of the logical-to-physical mapping table with an indication in the first table region data structure and no indication in the second table region data structure.

29. The non-transitory machine readable medium of claim 21, wherein the operations comprise erasing the second physical block after the valid physical pages of the second physical block are moved.

30. The non-transitory machine readable medium of claim 29, wherein the data structure is a bitmap, and wherein initializing the data structure includes writing logical zeros in each bit of the bitmap.

31. The non-transitory machine readable medium of claim 21, wherein the operations comprise:
  reading the updated first table region data structure during a garbage collection operation of the first physical block;
  loading regions of the logical-to-physical mapping table with an indication in the updated first table region data structure to move valid physical pages of the first physical block;
  removing indications of the logical-to-physical mapping table regions from a third table data structure that are loaded and do not include a reference to a physical page in a third physical block to create an updated third table region data structure; and
  writing the updated third table region data structure to the NAND device.

* * * * *